United States Patent [19]

Karidis et al.

[11] Patent Number: 4,810,914

[45] Date of Patent: Mar. 7, 1989

[54] LINEAR ACTUATOR WITH MULTIPLE CLOSED LOOP FLUX PATHS ESSENTIALLY ORTHOGONAL TO ITS AXIS

[75] Inventors: John P. Karidis, Ossining; Joseph P. Pawletko, Endwell, both of N.Y.

[73] Assignee: International Business Machines Corporation, Armonk, N.Y.

[21] Appl. No.: 31,321

[22] Filed: Mar. 26, 1987

[51] Int. Cl.[4] .......................................... H02K 41/00
[52] U.S. Cl. ...................................... 310/12; 310/14; 310/266
[58] Field of Search ................... 310/12–14, 310/266; 318/135

[56] References Cited

U.S. PATENT DOCUMENTS

| | | | |
|---|---|---|---|
| 2,803,761 | 8/1957 | Young | 310/14 |
| 2,831,990 | 4/1958 | Young | 310/14 |
| 3,162,796 | 12/1964 | Schreiber et al. | 310/12 X |
| 3,185,909 | 5/1965 | Jahn | 310/12 X |
| 3,219,853 | 11/1965 | Schreiber | 310/14 |
| 3,292,065 | 12/1966 | Fredrickson | 310/14 X |
| 3,356,877 | 12/1967 | Burr | 310/266 |
| 3,441,819 | 4/1969 | Palmero | 318/115 |
| 3,629,626 | 12/1971 | Abbott | 310/266 X |
| 3,869,625 | 3/1975 | Sawyer | 310/12 |
| 4,090,097 | 5/1978 | Seilly | 310/27 |
| 4,105,904 | 8/1978 | Seilly | 310/27 |
| 4,123,691 | 10/1978 | Seilly | 318/119 |
| 4,197,488 | 4/1980 | Kant | 318/115 |
| 4,215,283 | 7/1980 | Hinds | 310/14 |
| 4,286,180 | 8/1981 | Langley | 310/12 |
| 4,508,984 | 4/1985 | Défaucheux | 310/14 |
| 4,720,650 | 1/1988 | Hanamori et al. | 310/266 |

FOREIGN PATENT DOCUMENTS 5597177A 8/1980 Japan.

OTHER PUBLICATIONS

Pawlekto, J. P., and Chai, H. D., "Linear Step Motors," *Proc. Second Annual Symp. on Incremental Motion Control Systems and Devices*, Dept. of Elect. Eng., Univ. of Ill., Urbana, Apr. 1973.
Pawlekto, J. P., and Chai, H. D., "Linear Stepping Motor with Uncoupled Phases," *Proc. 13th Annual Symp. on Incremental Motion Control Systems and De-*vices, Dept. of Elect. Eng., Univ. of Ill., Urbana, May 1984.
Hinds, W. E. and Nocito, B., "The Sawyer Linear Motor," *Proc. Second Annual Symp. on Incremental Motion Control Systems and Devices*, Dept. of Elect. Eng., Univ. of Ill., Urbana, Apr. 1973.
Dawkins, G. and Rhodes, D. J., "An Electromagnetic Rotary-to-Linear Coupler," *Proceedings of the Int. Conf. on Electrical Machines*, Brussels, Belgium, Sep. 11–13, 1978.
Chai, H. D., "Permeance Model and Reluctance Force Between Toothed Structures," *Proc. Second Annual Symp. on Incremental Motion Control Systems and Devices*, Dept. of Elect. Eng., Univ. of Ill., Urbana, Apr. 1973.

*Primary Examiner*—Mark O. Budd
*Attorney, Agent, or Firm*—Carl C. Kling; Philip J. Feig; Marc D. Schechter

[57] ABSTRACT

Alternately stacked radial-pole stator and spacer laminations provide a simple linear actuator, in which alternating layers form magnetic teeth in the axial direction. The spacer laminations are non-ferromagnetic or dimensionally spaced from the flux path. The stator laminations have radially extending pairs of poles, forming a central hole which may be filled and ground smooth along with the spacers, forming smooth pole faces upon which the armature may slide.

Flux paths are coplanar with stator laminations, thus making each lamination completely independent. Electromagnetic force increases linearly as stator laminations are added. The stacked stator laminations have pole faces each having a finite pole face flux capacity; related armature rings can be mounted on a nonmagnetic support tube and made as light as possible so long as each ring is of sufficient cross-sectional area to carry half the pole face flux capacity. Tubular armatures provide maximum rigidity as a function of mass and permit the use of a stationary rod armature support for the tube armature. The support rod may be ferromagnetic to carry some of the flux, thereby further reducing the cross-section and the mass required for each ring.

20 Claims, 3 Drawing Sheets

LINEAR ACTUATOR WITH MULTIPLE CLOSED LOOP FLUX PATHS ESSENTIALLY ORTHOGONAL TO ITS AXIS

BACKGROUND OF THE INVENTION

1. Field of the Invention

This invention relates to linear actuators, and more particularly relates to a radial pole linear actuator having an armature and having a stator assembly configured as a stack of alternate radial pole segments and spacers resulting in balanced pairs of small closed flux loops essentially orthogonal to the axis of the actuator.

2. Related Prior Art

A large number of linear motors have been developed, including coupled-phase and uncoupled-phase variable reluctance designs as well as hybrid permanent-magnet designs, with a variety of magnetic flux paths to accomplish their desired operation.

Many existing designs for linear actuators rely on the aligning force that exists between opposing sets of ferromagnetic teeth which are carrying a magnetic flux. In some cases, where rotary motion of the shaft is desired, there is provision for flux paths orthogonal to the axis of the motor—but in linear motors, some portion of the flux path is generally parallel to the direction of motion.

REFERENCES

Pawletko, J. P., and Chai, H. D., "Linear Step Motors," *PROC. SECOND ANNUAL SYMP. ON INCREMENTAL MOTION CONTROL SYSTEMS AND DEVICES*, Dept. of Elect. Eng., Univ. of Ill., Urbana, April 1973, shows theory and manufacturing detail of a linear motor, but with an axial flux path and not with the in-segment flux path of this invention.

Pawletko, J. P., and Chai, H. D., "Linear Stepping Motor with Uncoupled Phases," *PROC. SECOND ANNUAL SYMP. ON INCREMENTAL MOTION CONTROL SYSTEMS AND DEVICES*, Dept. of Elect. Eng., Univ. of Ill., Urbana, May 1984, show an uncoupled phase linear step motor, but with an axial flux path and not with the in-segment flux path of this invention.

Hinds, W. E., and Nocito, B., "The Sawyer Linear Motor," *PROC. SECOND ANNUAL SYMP. ON INCREMENTAL MOTION CONTROL SYSTEMS AND DEVICES*, Dept. of Elect. Eng., Univ. of Ill., Urbana, April 1973, shows a multiple linear motor device with axial flux paths, not with the in-segment flux path of this invention.

Dawkins, G. and Rhodes, D. J., "An Electromagnetic Rotary-to-Linear Coupler," *PROCEEDINGS OF THE INT. CONF. ON ELECTRICAL MACHINES*, Brussels, Belgium, Sept. 11-13, 1978, shows a helenoid coupler with a double-start helical thread, used to convert rotary motion to linear motion.

Chai, H. D., "Permeance Model and Reluctance Force Between Toothed Structures," *PROC. SECOND ANNUAL SYMP. ON INCREMENTAL MOTION CONTROL SYSTEMS AND DEVICES*, Dept. of Elect. Eng., Univ. of Ill., Urbana, April 1973, shows theory of linear motor flux but does not show any in-segment flux path.

U.S. Pat. No. 3,441,819, Palmero, RECIPROCATING LINEAR MOTOR, Apr. 29, 1969, shows a linear motor in which flux flows axially from a helically toothed rotor to a toothed armature stack of alternate pairs of radial pole and spacer laminations, all of magnetic material.

U.S. Pat. No. 3,869,625, Sawyer, PLURAL AXIS LINEAR POSITION, Mar. 4, 1975, shows a linear motor with a shaft riding on tiny wheels in a set of channels, or equivalent air bearings, but uses an axial flux pattern between teeth on the platen and head.

U.S. Pat. No. 4,090,097, Seilly, ELECTROMAGNETIC DEVICES, May 16, 1978, shows an actuator-stator relationship in which projections on one element fit into slots of the other.

U.S. Pat. No. 4,105,904, Seilly, ELECTROMAGNETIC ACTUATORS, Aug. 8, 1978, shows a double-start helix arrangement in which electromagnetic effects of currents through closely intertwined conductors interact directly, without any pole pieces.

U.S. Pat. No. 4,123,691, Seilly, ELECTROMAGNETIC DEVICES, Oct. 31, 1978, shows an annular stator and movable armature, both with double-start helical grooves, and with the conductors positioned within the grooves of the stator.

U.S. Pat. No. 4,197,488, Kant, ELECTRICAL MACHINE, Apr. 8, 1980, shows a rotational-translational variable reluctance actuator having helical teeth in two mirror symmetrical half-planes. The flux path is axial.

U.S. Pat. No. 4,286,180, Langley, VARIABLE RELUCTANCE STEPPER MOTOR, Aug. 25, 1981, shows a variable reluctance stepper motor having matching helical threads on rotor and stator, and having spaces between threaded teeth filled with electrically conducting nonmagnetic solder. The flux path is linear.

Koide, Japan Patent Application 55-97177A, LINEAR PULSE MOTOR, Aug, 24, 1980, shows a specific formula of tooth pitch on the slider of a linear motor. The flux path is linear.

SUMMARY OF THE INVENTION

This actuator provides novel in-segment flux paths, essentially within planes normal to the axis of linear motion and inherently balanced, to provide an actuator with low armature mass and simplified design and assembly.

The object of the invention is to provide a linear actuator having novel in-segment flux paths for high performance. The linear actuator has small package size for a given force requirement and has a high ratio of force to armature mass, force and armature mass being linear functions of the actuator length.

Another object is to provide a linear actuator configuration which is well suited for use in multi-phase stepping motors, and can easily be replicated into a single, low-cost, planar multiple actuator structure.

Another object is to provide a multiple linear actuator design which is convenient to manufacture.

A feature of the invention is a radial-pole armature stack design using alternate simple, annular ferromagnetic pole pieces and simple similar nonferromagnetic spacers. Alternatively, the spacers can be of ferromagnetic material but with shorter poles.

Another feature of the invention is a balancing of radial flux forces, which balancing permits the use of a remarkably lightweight armature in a high performance linear actuator. The lightweight armature may be so lightweight as to lack self-support, or to lack flux-carrying capability, with the deficit made up by arranging the armature as a lightweight movable tube with ferromagnetic rings, the tube sliding upon a stationary flux-carrying support red which complements the deficits in self-support, flux-capacity, or both.

Another feature is a stacked stator arrangement which allows a very simple winding configuration.

The advantage of the invention is that it inexpensively provides high force output in a compact, low-mass package, and allows the motor force to be scaled easily by simply altering the count of radial pole/spacer lamination pairs (altering the length) of the stack.

Another advantage of the invention is that the simple stack, of radial pole laminations and spacer laminations, may include multiple channels for multiple slider shafts.

Another advantage is that a single complementary multiple channel lamination may serve as a pole laminator or as a spacer lamination simply by flipping it over.

Other objects, features and advantages of the invention will be apparent from the following description of preferred embodiments, as illustrated in the accompanying drawings.

DESCRIPTION OF A PREFERRED EMBODIMENT

Figure 1:
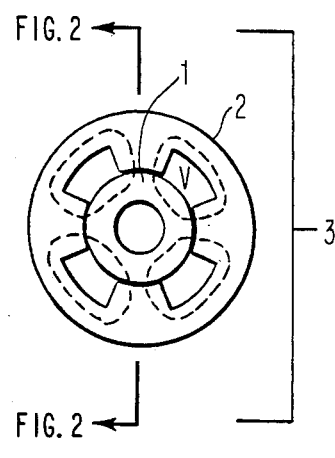
FIG. 1 is a cross section schematic view of the actuator.
Figure 2:
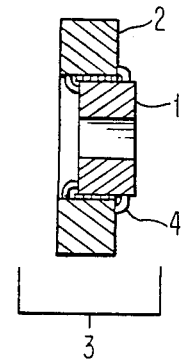
FIG. 2 is a cutaway view along a diameter as shown in FIG. 1.
Figure 3:
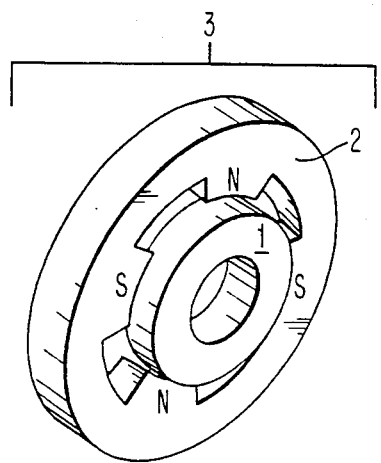
FIG. 3 is an isometric schematic view of a section of the actuator.

FIGS. 1-3 show the basic structure of one planar segment or "tooth" of the actuator. Each segment consists of a ring-like armature 1 centrally located within a stator lamination 2 of equal thickness. The armature ring 1 and stator lamination 2 together make up segment 3. Each stator lamination 2 has one or more pairs of pole extensions (2-N, 2-S) which form a partial circle just slightly larger in diameter than the armature ring 1. Separating pole extensions 2-S and 2-N are vacant areas 2-V. One or more coils 5 (not shown in FIGS. 1-3) are wound in the vacant areas 2-V between the pole extensions on the stator lamination 2 to create alternating north and south magnetic poles around the stator lamination 2. When a coil is energized, magnetic flux 4 is forced to circulate through the stator lamination 2 and the armature lamination 1 in four or more closed paths, as illustrated by the dotted lines in FIGS. 1-2.

When the armature ring 1 is located in the same plane as the stator lamination 2, the magnetic flux passing between the armature ring 1 and the stator lamination 2 produces no magnetic force in the axial direction. However, when the armature is displaced axially, as shown in FIG. 2, the variation in the magnetic reluctance of the flux path results in a magnetic force which tends to return the armature ring 1 to the plane of the stator lamination 2. In either case, the flux in the four poles will be almost equal (assuming small eccentricity of the armature) and only relatively small net radial forces will be developed.

AXIAL STACKING

Figure 4:
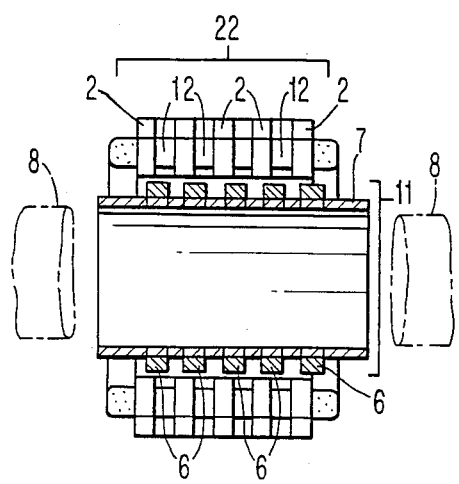
FIG. 4 is a simplified cutaway view of a lengthy section of the actuator, showing how spacer rings and stator plates relate to the coil and armature.
Figure 5:
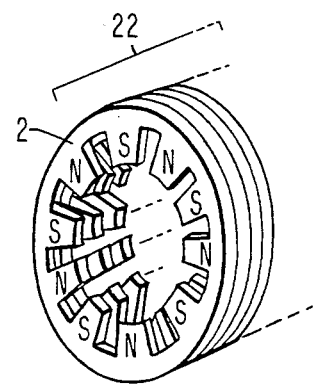
FIG. 5 is a simplified isometric view of a section of the stator, showing how N and S poles alternate around the stator.

FIG. 4 shows a lengthy section of the actuator. In most practical applications, the force produced by a single actuator segment, as shown in FIGS. 1-3, will not be sufficient to accomplish the desired task. In this case, any number of planar segments can be arranged axially as shown in FIG. 4. The stator laminations 2 are separated either by nonmagnetic spacers or, as in the preferred embodiment, by ferromagnetic laminations having vacant areas 2-V, and having shorter pole extensions that the "active" stator plate pole extensions which form the stator teeth 2-S and 2-N. The armature 11 in the preferred embodiment consists of discrete ferromagnetic rings 6 mounted on a ferromagnetic or nonferromagnetic armature support tube 7. Assuming that considerations such as moving mass dynamics and other dynamics mandate the use of a lightweight material (examples are plastic, glass, aluminum) for the armature support tube 7, then each ferromagnetic ring 6 must have sufficient bulk material to carry half of the magnetic flux from one stator pole in a circumferential arc from one tooth 2-N in each direction to each of the two neighboring teeth 2-S of the same segment stator lamination.

The force developed by this device is proportional to the product of the armature ring diameter, the fraction of the ring's circumference which is near a stator pole, and the number of rings which are stacked axially. An important advantage of this design is the great flexibility which arises from having each ring structure magnetically independent of its neighbors. The magnetic flux flows only in a small loop orthogonal to the linear axis, being confined to the arcuate segment (outer portion of a quadrant for a four-pole device) in the armature ring 6 and in the outer portions of the stator 2. Each flux loop lies in the angle of the armature are subtended by the arc of the stator shaft.

The dimensions of both the armature 11 and the stator 22 are independent of the number of teeth arrayed in the axial direction. This allows the actuator to be designed for a wide range of desired output force simply by stacking an appropriate number of teeth together. The diameter of the armature can be chosen based on structural considerations and on coil winding considerations as discussed later. This minimizes the number of different parts necessary to make a family of actuators with various force capabilities. This also means that the ratio of axial force to armature mass is independent of axial length. The maximum acceleration is independent of the peak force capability of the actuator.

COIL WINDING

Figure 6:
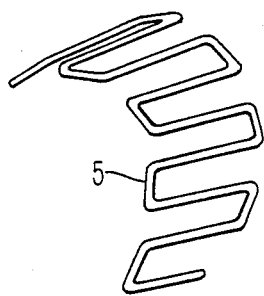
FIG. 6 is a simplified view of a snake winding.
Figure 7:
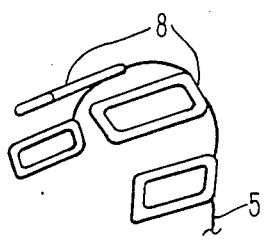
FIG. 7 is simplified view of connected, independently wound coils.

Two basic methods exist for winding the necessary coils on the axial stack of stator laminations, as shown in FIG. 35. FIG. 6 shows a single snake coil 5 is used to produce the required set of alternating magnetic poles. FIG. 7 shows several independent coils 8, which we wound separately and then connected appropriately in series or in parallel, to produce the alternating magnetic poles. The preferred winding method depends on manufacturing and assembly costs, as well as on the number of poles.

ARMATURE MASS REDUCTION

As noted above, the magnetic cross-section of a single armature ring need only be large enough to carry half of the flux that can be carried by a single stator pole. Thus, the use of a large number of stator poles reduces the cross-sectional area of each flux path and makes possible the use of a tubular armature structure combining very high rigidity with relatively low mass. The resulting disadvantage, of course, is that the additional coil paths increase the ohmic losses in the coils and may decrease the useful fraction of the armature circumference.

If an ultra-low-mass armature is required, a very thin tube 7 (FIG. 4) can be used in conjunction with a stationary ferromagnetic (for example, iron) support rod 8 located inside the armature tube. The magnetic flux flows from one pole, e.g., 2N of the stator segment 2, through a small air gap into the armature tooth 6 and tube 7, and then across another small air gap into the ferromagnetic internal support rod 8. The flux then splits and travels circumferentially within the support rod 8 to the next pole locations, up through the armature structure 7, 6 and the air gaps, and into adjacent stator poles 25. It thus becomes possible to use an armature so light that it cannot even perform the required flux closure, using the supplemental flux carrying capability of the support rod 8. This becomes very advantageous when great acceleration is desired, since the armature mass is minimized.

The stationary support rod 8 can also be used very conveniently as the bearing support for the armature tube, using sliding bearings, roller bearings, or air bearings, for example. When the armature tube 7 is in sliding contact with the flux-carrying support rod 8, it is advantageous to have it coated with a low-friction polymer or equipped with other appropriate lubrication. The support rod 8 may be hollowed out as well, and the internal cavity used as a distribution conduit for fluid material used as lubricant or fluid bearing. The conduit is connected to suitable distribution nozzels drilled through to the armature mating surface of the support rod. The fluid preferably is a ferrofluid to help in flux closure as well as to serve as being lubricant. Where an additional air gap is acceptable, the lubricating fluid may be pressurized air, or even grease.

LINEAR MOTOR APPLICATIONS

Figure 8:
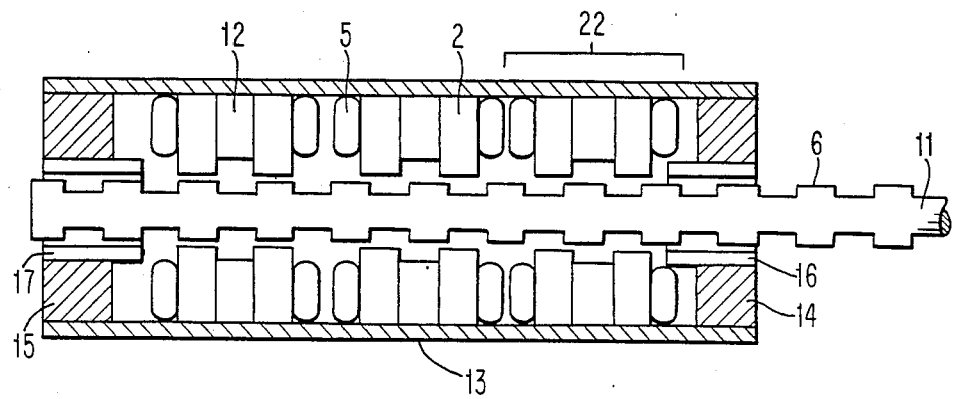
FIG. 8 is a cutaway schematic side elevation along the axis of the armature, showing construction of a linear 3-phase stepping motor.

FIG. 8 shows a three-phase linear motor constructed by properly placing three independent stator structures 22 along the length of the armature 11. The stator sections 2 for each phase are axially displaced from the neighboring phases by one-third of the tooth pitch as in conventional linear stepping motors. A high force-to-mass ratio is possible. Various step sizes can be achieved simply by changing the lamination thickness of the stator and the ring spacing on the armature. These factors permit manufacture of a wide range of linear stepping motors with capabilities significantly beyond those available in the present state of the art.

MULTIPLE-ACTUATOR PACKAGING

Figure 9:
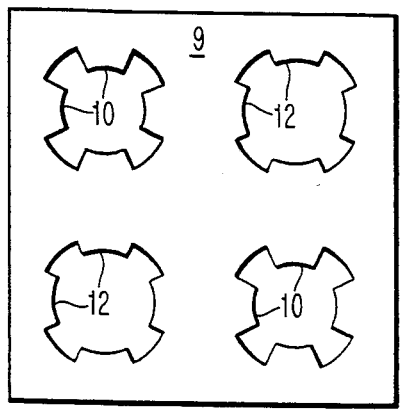
FIG. 9 is a plan view of a single lamination, showing how long poles and short poles may be alternated so that a single lamination pattern may be used for both pole and spacer by simply inverting alternate laminations.
Figure 10:
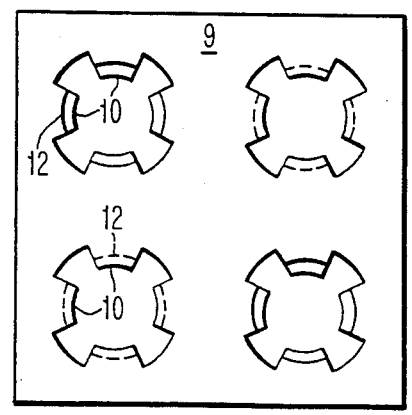
FIG. 10 is a plan view of a two-lamination stack, showing how the inverted lamination gives rise to spacer or pole when assembled face-up or inverted.

In many applications, such as impact printing, it is necessary to package large numbers of actuators very close to one another and at very low cost. This actuator is ideally suited to this situation because of the simple construction of the stator 22. As discussed above, the stator 22 of the actuator can consist of an alternating stack of ferromagnetic stator plates 9 (with full-length pole extensions 10) and ferromagnetic spacer plates 12 having shorter, non-active, pole extensions. In an actuator array, a single stamped iron lamination 9 as shown in FIG. 9 can serve as both the stator plate and the spacer plate simply by flipping plate 9 onto its back for alternate laminations in the stator stack. FIG. 10 shows the resulting integrated stator assembly (minus the necessary coils).

While the invention has been shown and described in the form of a simple, standalone actuator, and as a multiple actuator, both made of stacked segments with in-segment flux paths, it should be apparent to those skilled in the art that the foregoing armature mass reductions and other changes in form and detail may be made without departing from the spirit and scope of the invention, as defined in the following claims.

What is claimed is:

1. A linear actuator having a stator assembly (22), windings (5) and an internal armature assembly (11) mounted for controllable relative axial motion as a function of activating currents applied selectively to windings to cause magnetic flux patterns in the stator and in the armature tending to seek minimization of stored magnetic energy by relative motion of the armature and the stator,
    (a) said stator assembly (22) comprising an alternating stack of stator segments (2) and stator spacers (12), each stator segment configured with a plurality of stator poles (2N,2S) the windings (5) being related so as to activate said stator poles as a plurality of N poles alternating with an identical plurality of S poles, forming operative pole faces each having a finite pole face flux capacity; and
    (b) said armature assembly (11) comprising a set of rings (6) in rod configuration,
        whereby when the windings are selectively activated balanced pairs of small flux loops are generated substantially orthogonal to the axis of the actuator assembly, being confined to an arcuate segment in the ring (6) and corresponding portion of the stator segment (2).

2. A linear actuator according to claim 1, wherein said stator segments are ferromagnetic and said stator spacers (12) are nonferromagnetic and have substantially identical geometry to said ferromagnetic stator segments to allow a physically smooth surface to be formed on the pole faces.

3. A linear actuator according to claim 1, wherein said stator segments are ferromagnetic and said stator spacers (12) are ferromagnetic and have different pole geometry than said ferromagnetic stator segments (2).

4. A linear actuator according to claim 1 wherein said armature assembly (11) is supported by bearings, is ferromagnetic and has integral annular cut grooves.

5. The linear actuator of claim 1 wherein
said armature assembly (11) is a self-supporting tube (7) of ferromagnetic material supporting said rings (6) of ferromagnetic material.

6. The linear actuator of claim 5 wherein
each of said rings (6) together with its related portion of said tube (7) is of a mass less than the mass appropriate to carry the pole face flux capacity of a single stator lamination, and said armature assembly (11) includes a stationary flux-carrying support rod (8).

7. A linear actuator according to claim 1 wherein
said armature assembly (11) is a self-supporting tube (7) of nonferromagnetic material supporting said rings (6) of ferromagnetic material.

8. A linear actuator according to claim 7 wherein
each of said rings (6) is of mass less than the mass appropriate to carry the pole face flux capacity of a single stator lamination, and said armature assembly (11) includes a stationary flux-carrying support rod (8).

9. A linear actuator according to claim 1 wherein
said armature assembly (11) comprises a non-self supporting tube (7) of ferromagnetic material supporting said rings (6) of ferromagnetic material and a stationary support rod (8) in sliding support of said tube (7).

10. A linear actuator according to claim 9 wherein
each of said rings (6) together with its related portion of said tube (7) is of a mass less than the mass appropriate to carry the pole face flux capacity of a single stator lamination, and said armature assembly (11) includes a stationary flux-carrying support rod (8).

11. A linear actuator according to claim 1 wherein
said armature assembly (11) comprises a non-self-supporting tube (7) of nonferromagnetic material supporting said rings (6) of ferromagnetic material, and a support rod (8) in sliding support of said tube (7).

12. A linear actuator according to claim 7 wherein
each of said rings (6) is of a mass less than the mass appropriate to carry the pole face flux capacity of a single stator lamination, and said armature assembly (11) includes a flux-carrying support rod (8).

13. A linear actuator according to claim 1 wherein
said stator assembly is configured as a multiple actuator stator, with each stator segment comprising at least one pair of sets of stator poles, alternating with sets of spacer poles of different pole lengths, arranged symmetrically so that inverting alternate segments in a stack provides alternate segments with poles and spaces, and also provides openings for windings to be installed.

14. A linear actuator comprising:
a stator having at least one substantially planar magnetizable lamination with an opening arranged around an actuator axis, said stator lamination being substantially perpendicular to the actuator axis and having at least four poles extending radially with respect to the axis, said poles being arranged around the axis at substantially equal angular spacings;
an armature having at least one substantially planar magnetizable lamination arranged around the actuator axis, said armature lamination being substantially perpendicular to the axis and being arranged to slide along the axis, said armature lamination being spaced from the stator poles by gaps; and
means for generating magnetic flux within closed flux paths containing the stator lamination, the armature lamination, and the gaps, said closed flux paths being substantially planar and substantially perpendicular to the axes.

15. A linear actuator comprising:
a stator having at least one substantially planar magnetizable lamination with a first opening arranged around a first actuator axis and with a second opening arranged around a second actuator axis, said stator lamination being substantially perpendicular to the first and second actuator axes, said first actuator axis being substantially parallel to but spaced from said second actuator axis, said stator lamination having at least four first poles extending toward the first axis, said stator lamination having at least four second poles extending toward the second axis, said first poles being arranged around the first axis at substantially equal angular spacings, said second poles being arranged around the second axis at substantially equal angular spacings;
a first armature having at least one substantially planar magnetizable lamination arranged around the first axis, said first armature lamination being substantially perpendicular to the first axis and being arranged between the stator and the first axis to slide along the first axis, said first armature lamination being spaced from the first stator poles by first gaps;
a second armature having at least one substantially planar magnetizable lamination arranged around the second axis, said second armature lamination being substantially perpendicular to the second axis and being arranged between the stator and the second axis to slide along the second axis, said second armature lamination being spaced from the second stator poles by second gaps;
first means for generating magnetic flux within closed flux paths containing the stator lamination, the first armature lamination, and the first gaps, said closed flux paths being substantially planar and substantially perpendicular to the axes; and
second means for generating magnetic flux within flux paths containing the stator lamination, the second armature lamination, and the second gaps, said closed flux paths being substantially planar and substantially perpendicular to the axes.

16. A linear actuator comprising:
a stator having a plurality of magnetizable stator laminations arranged in a stack of odd stator laminations separated by even stator laminations, each stator lamination having a first opening arranged around a first actuator axis and having a second opening arranged around a second actuator axis, each stator lamination being substantially perpendicular to the first and second actuator axes, said first actuator axis being substantially parallel to but spaced from said second actuator axis, each odd stator lamination having at least four first poles extending toward the first axis to within a first distance, each odd stator lamination extending toward the second axis to within a second distance larger than the first distance, said first poles being arranged around the first axis at substantially equal angular spacings, each even stator lamination having at least four second poles extending toward the second axis to within a third distance, each even stator lamination extending toward the first axis to within a fourth distance larger than the third distance, said second poles being arranged around the second axis at substantially eqal angular spacings;

a first armature having a plurality of substantially planar magnetizable laminations arranged around the first axis, each first armature lamination being substantially perpendicular to the first axis, said first armature being arranged between the stator and the first axis to slide along the first axis, said first armature laminations being spaced from the first stator poles by first gaps;

a second armature having a plurality of substantially planar magnetizable laminations arranged around the second axis, each second armature lamination being substantially perpendicular to the second axis, said second armature being arranged between the stator and the second axis to slide along the second axis, said second armature laminations being spaced from the second stator poles by second gaps;

first means for generating magnetic flux within closed flux paths formed by the odd stator laminations, the first armature laminations, and the first gaps, said closed flux paths being substantially planar and substantially perpendicular to the axes; and second means for generating magnetic flux within closed flux paths formed by the even stator laminations, the second armature laminations, and the second gaps, said closed flux paths being substantially planar and substantially perpendicular to the axes.

17. A linear actuator comprising:

a support rod arranged on an actuator axis, said support rod being fixed with respect to the stator;

a stator having at least one magnetizable lamination with an opening arranged around the support rod;

an armature having at least one magnetizable lamination with an opening arranged around the support rod, said armature lamination being arranged between the stator and the support rod and being slidably mounted on the support rod, said armature lamination being spaced from the stator by gaps; and means for generating magnetic flux within flux paths containing the stator lamination, the armature lamination, and the gaps.

18. A linear actuator as claimed in claim 17, characterized in that the armature is not self supporting.

19. A linear actuator as claimed in claim 18, characterized in that the support rod is not magnetizable.

20. A linear actuator as claimed in claim 19, characterized in that:

the stator lamination is substantially planar and substantially perpendicular to the actuator axis, and has at least four poles extending toward the axis, said poles being arranged around the axis at substantially equal angular spacings;

the armature lamination is substantially planar and substantially perpendicular to the axis; and the flux paths are closed flux paths, are substantially planar, and are substantially perpendicular to the axis.

* * * * *